(12) United States Patent
Klein

(10) Patent No.: US 8,209,899 B2
(45) Date of Patent: Jul. 3, 2012

(54) FLYLINE CONNECTING DEVICE

(76) Inventor: Arnold Gregory Klein, Sandia Park, NM (US)

(*) Notice: Subject to any disclaimer, the term of this patent is extended or adjusted under 35 U.S.C. 154(b) by 186 days.

(21) Appl. No.: 12/291,717

(22) Filed: Nov. 14, 2008

(65) Prior Publication Data

US 2009/0142132 A1 Jun. 4, 2009

Related U.S. Application Data

(60) Provisional application No. 61/004,631, filed on Nov. 30, 2007.

(51) Int. Cl.
*A01K 91/12* (2006.01)
*A01K 91/047* (2006.01)

(52) U.S. Cl. ........ 43/44.98; 43/43.1; 43/44.9; 43/44.91; 24/115 R; 24/115 N; 294/86.42; 403/24

(58) Field of Classification Search .............. 43/44.98, 43/43.1, 44.9, 44.91; 403/24, 291, 301, 300, 403/373; 294/86.42; 87/6, 8–11; 24/128, 24/115 N, 115 R; 254/134.3 R, 134.3 FT
See application file for complete search history.

(56) References Cited

U.S. PATENT DOCUMENTS

| | | | | |
|---|---|---|---|---|
| 832,401 A * | 10/1906 | Martin | ............... | 254/134.3 FT |
| 1,114,637 A * | 10/1914 | Nolan | ............... | 254/134.3 FT |
| 1,670,543 A * | 5/1928 | Kellems | ............... | 294/86.42 |
| 1,769,479 A * | 7/1930 | Whaley | ............... | 294/86.42 |
| 1,802,657 A * | 4/1931 | Kellems | ............... | 254/134.3 FT |
| 1,949,298 A * | 2/1934 | Fabel | ............... | 29/464 |
| 1,994,674 A * | 3/1935 | Van Inwagen, Jr. | ............... | 294/86.42 |
| 2,017,625 A * | 10/1935 | Kellems | ............... | 294/86.42 |
| 2,093,838 A * | 9/1937 | Kellems | ............... | 87/9 |
| 2,112,281 A * | 3/1938 | Ferris | ............... | 294/86.42 |
| 2,117,322 A * | 5/1938 | Hillman | ............... | 43/42.72 |
| 2,164,278 A * | 6/1939 | Kellems | ............... | 294/86.42 |
| 2,268,598 A * | 1/1942 | Kellems | ............... | 294/86.42 |
| 2,413,642 A * | 12/1946 | Mitchell | ............... | 87/8 |
| 2,434,358 A * | 1/1948 | Frank | ............... | 294/86.42 |
| 2,602,207 A * | 7/1952 | Kellems | ............... | 294/86.42 |
| 2,650,400 A * | 9/1953 | Kellems | ............... | 294/86.42 |
| 2,676,376 A * | 4/1954 | Kellems | ............... | 294/86.42 |
| 2,688,172 A * | 9/1954 | Kellems | ............... | 294/86.42 |

(Continued)

FOREIGN PATENT DOCUMENTS

EP 120144 A1 * 10/1984

(Continued)

*Primary Examiner* — Darren W Ark

(57) ABSTRACT

The invention provides a convenient, lightweight and streamlined connecting device for attaching a leader or tippet to a fly-fishing line. The Fly Line Connecting Device is configured with an expandable tubular lattice that allows for an in-line connection to the fly line. The connection device has an integral tubular lattice sized with an internal diameter that is slightly smaller that the fly line and when compressively displaced, operates to expand the internal diameter to allow insertion of the fly line. Once the fly line is fully inserted, the tubular lattice is allowed to contract and elastically constrict onto and thereby grip the semi-resilient surface of the fly line. When the fly line and leader line are placed in tension through the connecting device, the tubular lattice acts to constrict down on the fly-line to resist separation. The connecting device of the invention is configured with a loop, eyelet, knot-trapping feature, or short tippet to allow for the convenient attachment of the leader line. Alternatively, the connecting device is permanently attached or integrally formed with a full-length leader. The preferred embodiment of the connecting device is injection molded in an intermediate form that is configured to be manually or machine cold-drawn to the final working dimensions and optimal physical properties.

12 Claims, 9 Drawing Sheets

U.S. PATENT DOCUMENTS

| | | | | |
|---|---|---|---|---|
| 2,688,961 A * | 9/1954 | Thomas | .................... | 24/115 H |
| 2,740,178 A * | 4/1956 | Kellems | .................... | 294/86.42 |
| 2,766,501 A * | 10/1956 | Kellems | .................... | 294/86.42 |
| 2,865,978 A * | 12/1958 | Modrey | .................... | 403/291 |
| 2,870,563 A * | 1/1959 | Rose | .................... | 43/44.4 |
| 2,901,822 A * | 9/1959 | Hayden | .................... | 403/301 |
| 2,933,798 A * | 4/1960 | Miller et al. | .................... | 43/44.98 |
| 2,936,257 A * | 5/1960 | Nailler et al. | .................... | 87/9 |
| 2,972,831 A * | 2/1961 | Anselmi | .................... | 43/44.4 |
| 3,033,502 A * | 5/1962 | Silver | .................... | 24/115 N |
| 3,041,695 A * | 7/1962 | Ouellette | .................... | 403/301 |
| 3,102,715 A * | 9/1963 | Weitzel et al. | .................... | 254/134.3 FT |
| 3,122,806 A * | 3/1964 | Lewis | .................... | 294/86.42 |
| 3,133,725 A * | 5/1964 | Lanum | .................... | 294/86.42 |
| 3,137,765 A * | 6/1964 | Lanum | .................... | 294/86.42 |
| 3,183,658 A * | 5/1965 | Drinko et al. | .................... | 403/300 |
| 3,192,617 A * | 7/1965 | Meyer | .................... | 294/86.42 |
| 3,287,778 A * | 11/1966 | Cannizzaro | .................... | 403/300 |
| 3,452,639 A * | 7/1969 | Passman | .................... | 87/6 |
| 3,464,140 A * | 9/1969 | Carabasse | .................... | 43/44.98 |
| 3,583,749 A * | 6/1971 | Hopkins | .................... | 403/209 |
| 3,622,685 A * | 11/1971 | Crowl | .................... | 174/44 |
| 3,672,006 A * | 6/1972 | Fidrych | .................... | 294/86.42 |
| 3,717,907 A * | 2/1973 | Klein | .................... | 43/44.9 |
| 3,762,507 A * | 10/1973 | Starr | .................... | 294/86.42 |
| 3,779,593 A * | 12/1973 | Neuroth | .................... | 294/86.42 |
| 3,826,034 A * | 7/1974 | Herek | .................... | 43/44.83 |
| 3,834,061 A * | 9/1974 | Klein | .................... | 43/44.9 |
| 3,854,767 A * | 12/1974 | Burnett | .................... | 294/74 |
| 3,868,785 A * | 3/1975 | Foote | .................... | 43/44.98 |
| 3,872,861 A * | 3/1975 | Tamny et al. | .................... | 602/36 |
| 3,883,102 A * | 5/1975 | Trigg | .................... | 403/291 |
| 3,931,656 A * | 1/1976 | Thomson | .................... | 441/75 |
| 4,036,101 A * | 7/1977 | Burnett | .................... | 87/8 |
| 4,048,744 A * | 9/1977 | Chandler | .................... | 43/44.98 |
| 4,117,574 A * | 10/1978 | Yoshida | .................... | 403/291 |
| 4,155,973 A * | 5/1979 | Klein | .................... | 43/44.98 |
| 4,178,342 A * | 12/1979 | Klein | .................... | 43/44.98 |
| 4,198,173 A * | 4/1980 | Zehren | .................... | 403/291 |
| 4,225,172 A * | 9/1980 | Marquardt | .................... | 294/86.42 |
| 4,258,608 A * | 3/1981 | Brown | .................... | 87/6 |
| 4,321,854 A * | 3/1982 | Foote et al. | .................... | 43/44.98 |
| 4,354,705 A * | 10/1982 | Shorey et al. | .................... | 294/86.42 |
| 4,368,910 A * | 1/1983 | Fidrych | .................... | 294/86.42 |
| 4,514,005 A * | 4/1985 | Fallon | .................... | 294/86.42 |
| 4,550,938 A * | 11/1985 | Nakanishi et al. | .................... | 43/44.98 |
| 4,597,351 A * | 7/1986 | Brainard, II | .................... | 294/74 |
| 4,601,507 A * | 7/1986 | Fallon | .................... | 294/86.42 |
| 4,604,821 A * | 8/1986 | Moser | .................... | 43/44.98 |
| 4,735,035 A * | 4/1988 | Mattioli | .................... | 87/11 |
| 4,779,372 A * | 10/1988 | Pozo Obeso | .................... | 43/44.98 |
| 4,827,661 A * | 5/1989 | Wendler | .................... | 43/44.98 |
| 4,864,767 A * | 9/1989 | Drosdak | .................... | 43/43.1 |
| 4,969,677 A * | 11/1990 | Melegari | .................... | 294/86.42 |
| 5,038,663 A * | 8/1991 | Plummer | .................... | 87/6 |
| 5,083,522 A * | 1/1992 | Ashrow | .................... | 114/215 |
| 5,087,309 A * | 2/1992 | Melton, Jr. | .................... | 156/198 |
| 5,133,583 A * | 7/1992 | Wagman et al. | .................... | 294/86.42 |
| 5,341,758 A * | 8/1994 | Strickland | .................... | 87/6 |
| 5,451,203 A * | 9/1995 | Lamb | .................... | 602/36 |
| 5,469,652 A * | 11/1995 | Drosdak | .................... | 43/44.98 |
| 5,480,203 A * | 1/1996 | Favalora et al. | .................... | 294/86.42 |
| 5,483,911 A * | 1/1996 | Kubli | .................... | 87/2 |
| 5,625,976 A * | 5/1997 | Goodale | .................... | 43/44.98 |
| 5,863,083 A * | 1/1999 | Giebel et al. | .................... | 294/86.42 |
| 5,950,351 A * | 9/1999 | Walker et al. | .................... | 43/44.4 |
| 6,209,531 B1 * | 4/2001 | Boon | .................... | 254/134.3 R |
| 6,293,519 B1 * | 9/2001 | Farretta | .................... | 254/134.3 FT |
| 6,296,659 B1 * | 10/2001 | Foerster | .................... | 606/224 |
| 6,575,072 B2 * | 6/2003 | Pellerin | .................... | 87/6 |
| 6,665,978 B1 * | 12/2003 | Reed | .................... | 43/44.4 |
| 6,758,007 B1 * | 7/2004 | Schneider | .................... | 43/44.98 |
| 6,871,442 B2 * | 3/2005 | Wyatt | .................... | 43/44.4 |
| 6,880,289 B1 * | 4/2005 | Yin | .................... | 43/44.98 |
| 6,974,169 B1 * | 12/2005 | Upton | .................... | 294/86.42 |
| 7,003,911 B2 * | 2/2006 | Schoenike | .................... | 43/44.91 |
| 7,285,124 B2 * | 10/2007 | Foerster | .................... | 606/139 |
| 7,406,797 B2 * | 8/2008 | Harder et al. | .................... | 43/44.98 |
| 7,568,418 B2 * | 8/2009 | Kijesky | .................... | 87/9 |
| 2002/0029066 A1* | 3/2002 | Foerster | .................... | 606/228 |
| 2002/0108294 A1* | 8/2002 | Denby | .................... | 43/43.12 |
| 2005/0268525 A1* | 12/2005 | Kalazich | .................... | 43/44.4 |
| 2006/0130389 A1* | 6/2006 | Annelin | .................... | 43/44.98 |
| 2006/0143973 A1* | 7/2006 | Corbitt, III | .................... | 43/44.8 |
| 2006/0225337 A1* | 10/2006 | Moffitt | .................... | 43/44.98 |
| 2009/0056122 A1* | 3/2009 | Allen | .................... | 29/868 |
| 2009/0119973 A1* | 5/2009 | Moffitt | .................... | 43/44.98 |
| 2009/0194970 A1* | 8/2009 | Yeh et al. | .................... | 280/483 |

FOREIGN PATENT DOCUMENTS

| | | | | |
|---|---|---|---|---|
| GB | 2038151 A | * | 7/1980 | |
| GB | 2192521 A | * | 1/1988 | |
| JP | 05184274 A | * | 7/1993 | |
| JP | 08214746 A | * | 8/1996 | |
| JP | 09256288 A | * | 9/1997 | |
| JP | 2003052288 A | * | 2/2003 | |
| JP | 2005058001 A | * | 3/2005 | |
| JP | 2006067922 A | * | 3/2006 | |
| JP | 2006081526 A | * | 3/2006 | |
| JP | 2006325439 A | * | 12/2006 | |
| JP | 2007151477 A | * | 6/2007 | |
| JP | 2007209313 A | * | 8/2007 | |
| JP | 2008133571 A | * | 6/2008 | |
| WO | WO 9622682 A1 | * | 8/1996 | |

* cited by examiner

Fig. 4
Fig. 5
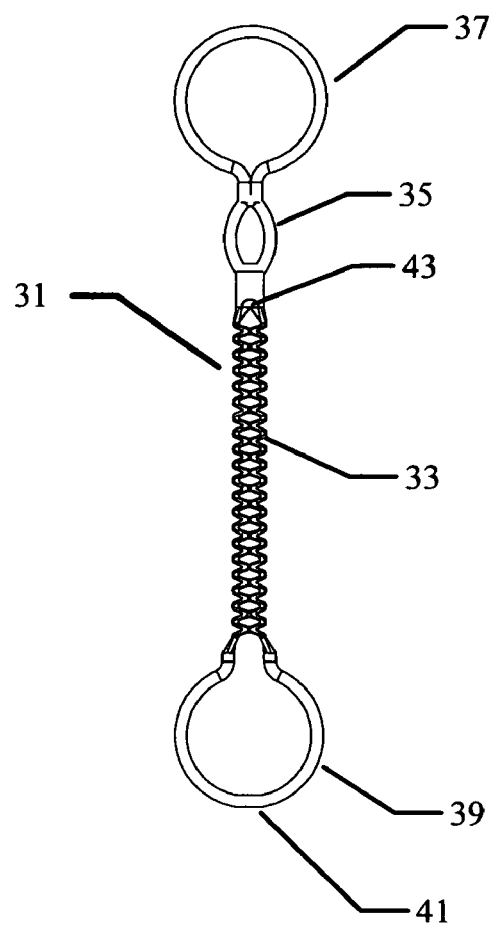
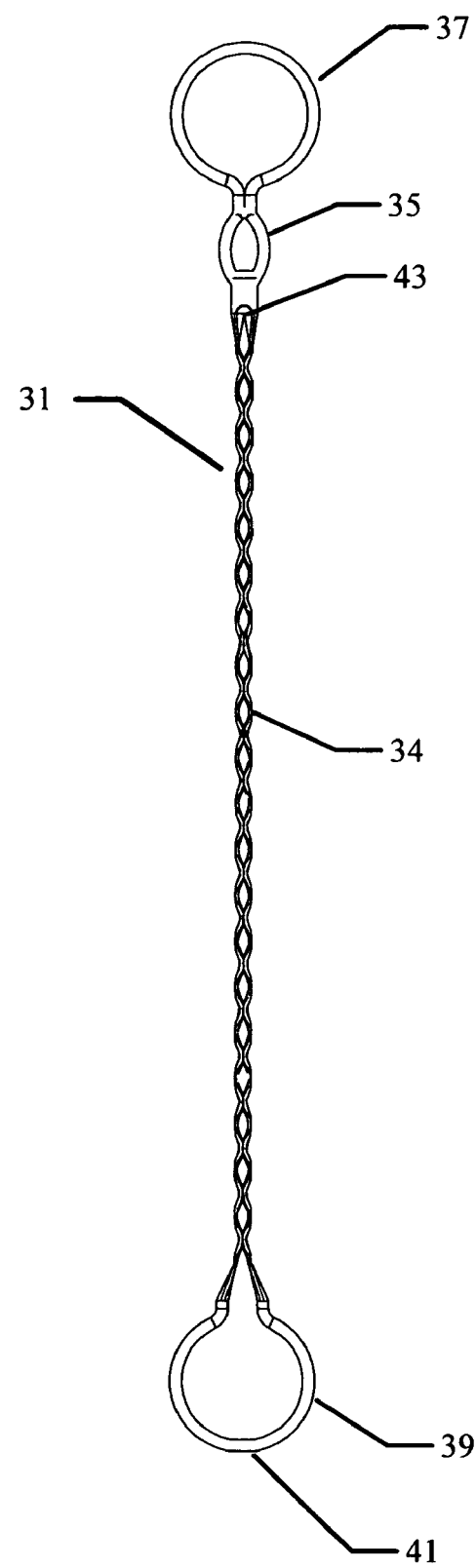

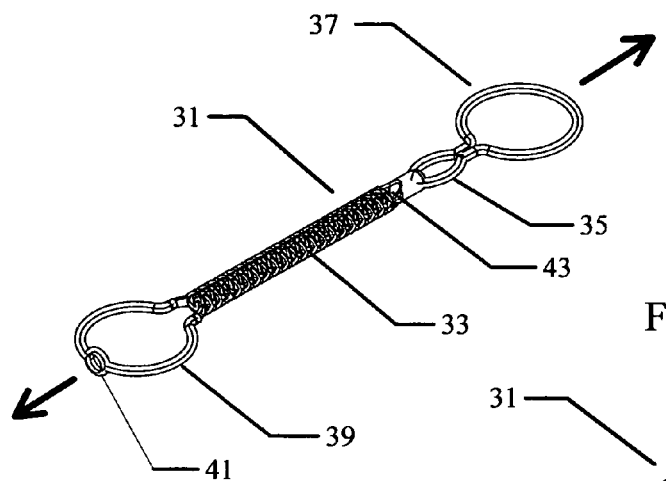
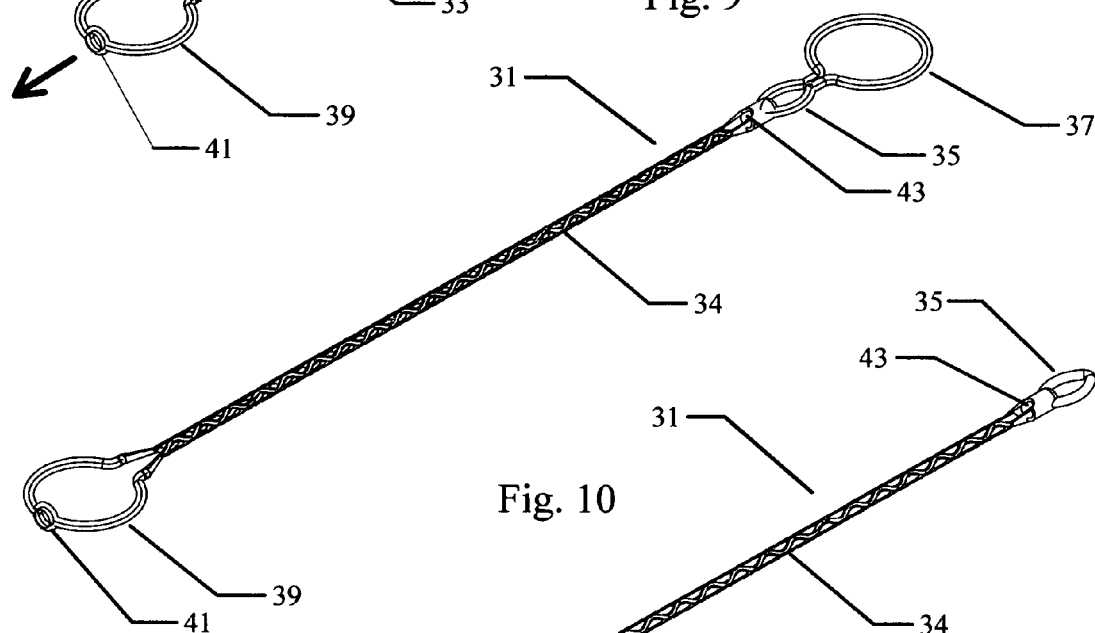
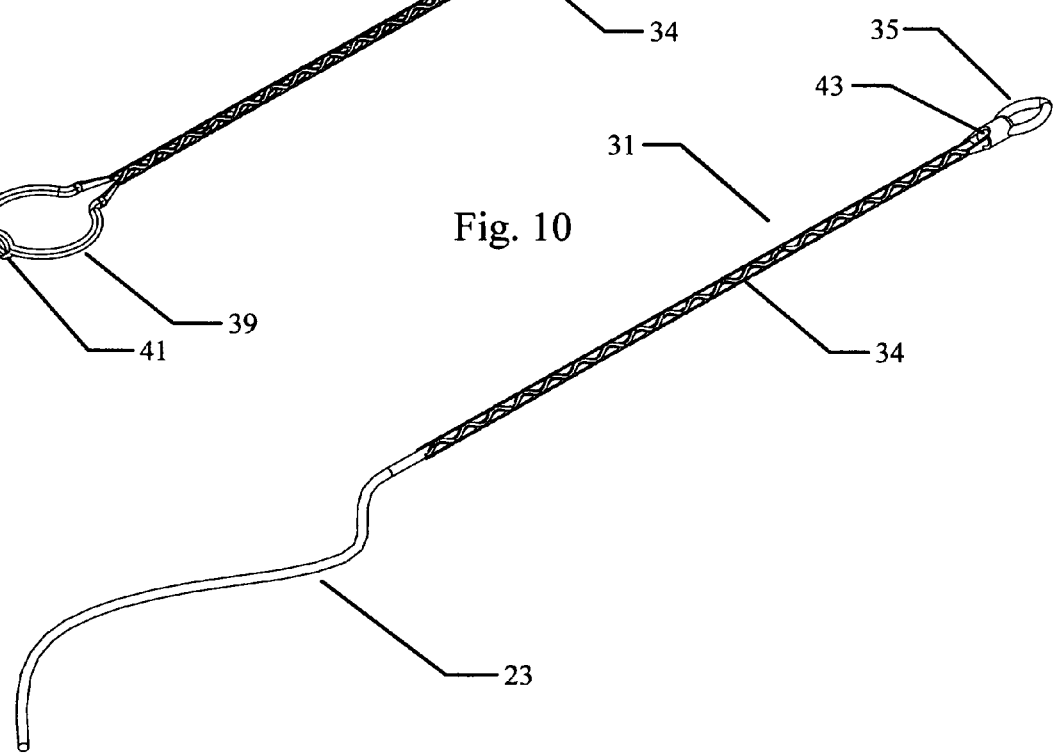

Fig. 13
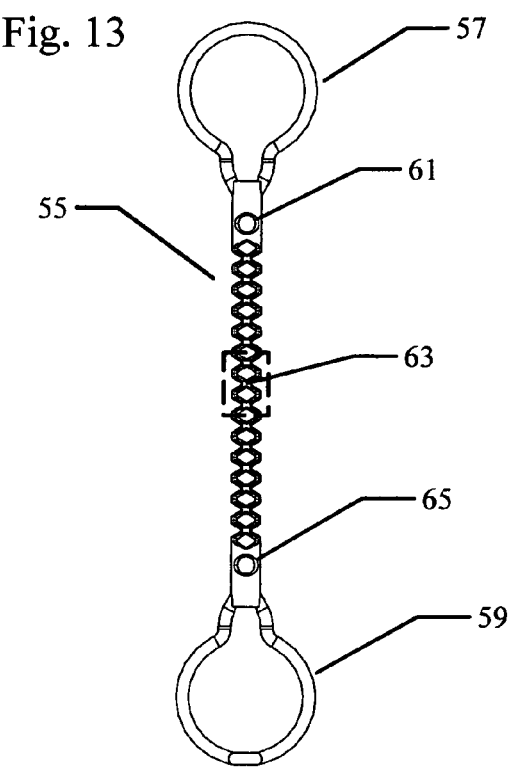
Fig. 14
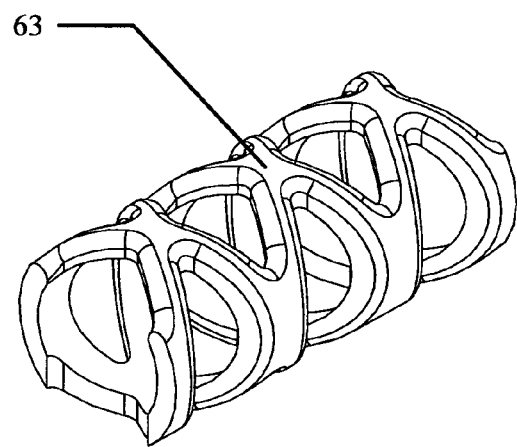
Fig. 15
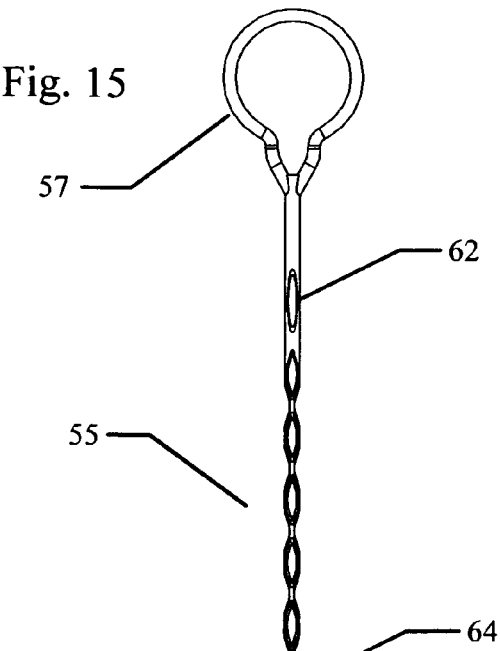
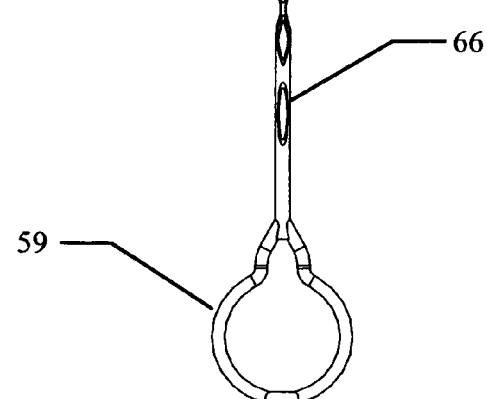

Fig. 16
Fig. 17
Fig. 18
Fig. 19
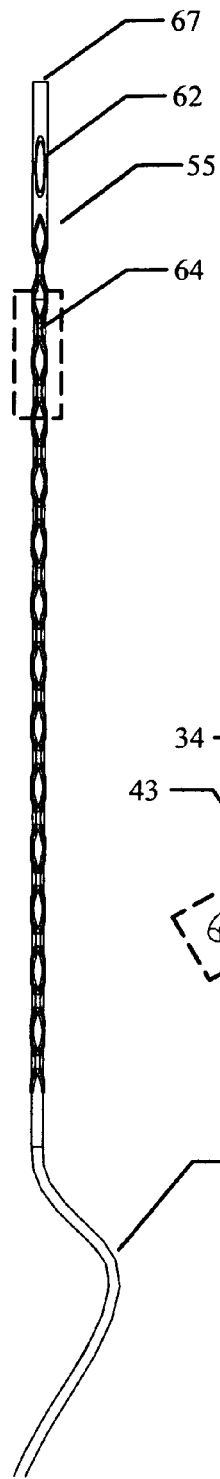
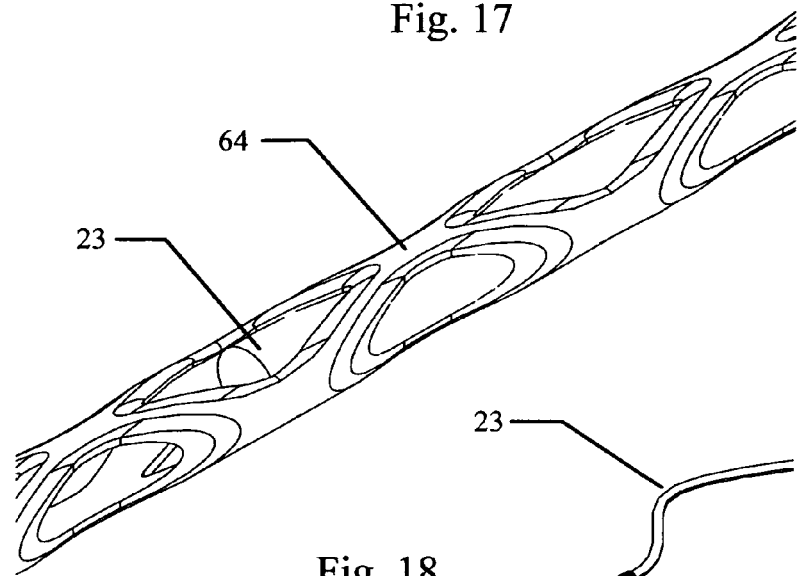
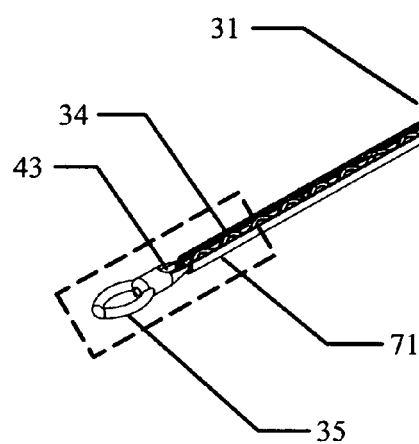
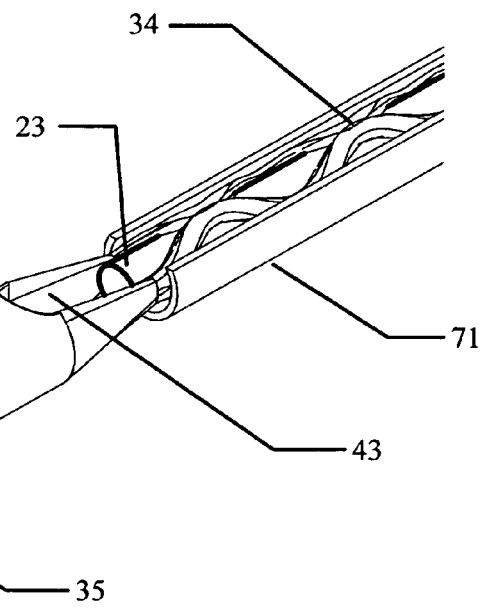

FLYLINE CONNECTING DEVICE

Applicant claims the benefit of provisional patent application No. 61/004,631 filed Nov. 30, 2007.

FIELD OF THE INVENTION

The instant invention is for a device to be used for the practice of fly-fishing. The device is used to connect the fly line to the leader line or tippet.

BACKGROUND OF THE INVENTION

The practice of fly-fishing typically requires the fisherman to make some sort of tension resisting connection between the weighted fly line (normally tapered, and coated with a semi-resilient polymer) and a leader line (clear or slightly tinted) to which the artificial fly, nymph or other fish attracting lure is terminally attached. These two lines, the fly-line and leader-line are designed with very different attributes and are not most effectively or reliably connected to each other using knots, even those developed specifically for this purpose.

This fly line to leader connection problem is addressed by a number of prior art devices, all of which have inherent advantages and disadvantages. One of the best prior art solutions is disclosed in detail in the U.S. Pat. Nos. 3,717,907 and 3,834,061. These patents disclose a small, flexible plastic link with transverse openings at each end to receive the leader and fly line respectively. The line ends are threaded through these transverse openings to project through a side opening in the link. The extending line ends are then both tied in knots that are then trimmed and pulled back into the link where they are held secure. This leader connector device is reasonably reliable in maintaining tension between the two lines when the knots are carefully tied. In practice, it is often fairly difficult to re-insert the knot end of the fly line back into the link, due to the size interference between the fly line knot and the link slot. It is often necessary to try and strip off some of the fly line surface coating before tying the knot in an attempt to reduce the overall knot size, but this is difficult to do without damaging the tensile bearing core. There is sometimes the additional problem of tying the leader knot with a sufficient cross section to keep it from being pulled transversely through the link. The practical necessity to tie an overhand knot in the fly line and a clinch knot in the leader and then to seat these knots within the very confined space of the link slot along with the relatively large link diameter (as compared to the fishing lines) has made this fly-line to leader link a less than desirable solution to a large number of fly fishing practitioners.

Currently, the most popular fly line to leader connection device is referred to as a "braided loop". These braided loops are somewhat difficult to install as they must be progressively expanded and pulled (teased) over the terminal end of the fly line. Once installed, they are held secure to the fly line in the same manner that a woven "Chinese finger trap" (children's novelty toy) grips a finger. This gripping action works to secure these braided loops because the polymer coating of the fly line has a semi-resilient surface covering. This semi-resilient surface allows the braided mesh to grip the line when the braided loop and fly line are placed in tension. Unfortunately, installing these braided loops always results in the fraying of the braided tubular opening of the device. This frayed end must be covered with a heat shrink or elastic tubing to keep it from further fraying and to prevent the frayed edge from getting snagged on the fishing rod guides or other obstructions or snags as typically encountered while fishing. Failure to cover this frayed end will typically result in the braided loop being pulled off the fly line. The installation difficulties and performance drawbacks of the braided loops are actually more serious than the fly line to leader connector links as described above, but they remain very popular. There are numerous other connector devices in the prior art for connecting the fly fishing line to the leader line but they use structurally rigid clamping jaws or external barbs (U.S. Pat. Nos. 4,864,767 and 5,469,652) to secure them to the fly line. In order to maintain sufficient clamping pressure or structural rigidity to keep the ridges or barbs engaged, these connectors are larger and heavier than is desirable for use with fly fishing lines. There are also some specialized fly lines and leaders with a built in connection means (U.S. Pat. Nos. 5,469,652 and 6,880,289). These specialized connecting lines have to be used exclusively with each other, and as a result are limiting to the flexibility of line and leader setup by the fisherman. These specialized devices also tend to be larger in size than is desirable. None of the prior art connection devices makes use of a light, flexible, compressively expandable tubular lattice structure to make a reliable, in-line, and very streamlined connection between the fly line and leader line.

The prior art braided loops will be described in more detail in the accompanying Detailed Description section with reference to the "prior art" patent application FIGS. 1 through 3. The instant Fly Line Connecting Device is described in the accompanying Detailed Description section and the details are shown in the application FIGS. 4 through 24.

SUMMARY OF THE INVENTION

It is the primary objective of the instant invention to provide an improved connector device for attaching the leader line or tippet to a fly fishing line. The key feature of this improved connecting device is the development of an elastically compressible tubular lattice that is of a unitary or unwoven structure. This flexible tubular lattice structure allows for a small, light and streamlined, in-line connection of the device to the fly-line. The manufacture of this tubular lattice feature is most easily achieved by the injection molding of an intermediate configuration having oversized dimensions. Once the intermediate configuration is injection molded, the device may be manually or machine "cold drawn" (stretched) to reduce the tubular lattice inside diameter, wall section and to greatly increase the tensile strength and toughness. The cold drawing operation, whether performed by the fisherman or completed at the end of the molding cycle, is facilitated by the incorporation of integrally molded stretching loops or other holding features. These stretching loops are clipped off the device by a secondary manufacturing operation or by the fisherman before the device is installed over the fly line. Installing the device is performed by distally compressing the tubular lattice and thereby expanding the inside diameter to allow for the progressive insertion of the fly line. Once the fly line is fully inserted, the fisherman releases the compressive force and the tubular lattice contracts down to constrict the fly line. It is important to note that the in the relaxed state (not compressed), the tubular lattice inside diameter is somewhat smaller than the fly line diameter so that it will elastically grip the fly line. The expandable tubular lattice tightens down and grips the fly line even more securely when a tension force is applied.

An assembly aid in the form of a longitudinally slit or trough shaped tube may be supplied to support and constrain the tubular lattice portion of the device while the fly-line is being inserted.

There are a number of different options and associated features for attaching the leader line or tippet to the connector device. The leader line or tippet may be tied directly or looped with an integrally formed loop or eyelet. Alternatively, the leader line or tippet may be affixed to the device using a very small knot-trapping feature. The leader line or tippet being typically much smaller in diameter than the fly line can be secured within the knot holding feature using a relatively small overhand knot. An advantage of using the knot holding feature over the loop or eyelet is that the connection between the lines is very small and streamlined and this connection maintains axial alignment and stiffness between the lines. The axially aligned connection does not pivot or hinge as loop connections tend to do, thus preserving the fly-casting energy and accuracy. This fly line connecting device has substantial advantages over the existing knots and connection devices by virtue of being very lightweight, streamlined (low air/water resistance), and axial stiffness or resistance to pivoting or hinging at the connection junction.

The preferred embodiment of the Fly-Line Connecting Device is injection molded using nylon, polyester, fluorocarbon or any other high molecular weight plastic that can be "cold drawn". The connection device will typically be made with a high visibility color so the device may function secondarily as a strike indicator.

BRIEF DESCRIPTION OF THE DRAWINGS

The patent figures are intended to demonstrate some, but not necessarily all of the design configurations for the Fly-Line to Leader Connecting Device. It is important when looking at the drawing figures to understand that this connecting device is very small. The tubular lattice portion of the device typically fits over a fly-fishing line that ranges approximately from 0.030" to 0.060" diameter. It is for this reason, and to clearly show the details of the connecting device, that the patent figures show the Fly-Line To Leader Connecting Device drawn larger than true scale.

FIG. 4 depicts an enlarged front view of the fly-line to leader connecting device of the instant invention;

FIG. 5 depicts an enlarged front view of the device of FIG. 4 after the device has been cold drawn;

FIG. 8 depicts an isometric view of the fly-line to leader connecting device prior to cold drawing;

FIG. 9 depicts an isometric view of the fly-line to leader connecting device after cold drawing;

FIG. 10 depicts an isometric view of the fly-line to leader connecting device with the pulling loops clipped off and the device installed over the end of a fly fishing line;

FIG. 13 depicts a front view of an alternate configuration of the fly-line to leader connecting device;

FIG. 14 depicts an enlarged isometric detail view of the tubular lattice of the alternate configuration of the fly-line to leader connecting device of FIG. 13;

FIG. 15 depicts a front view of the alternate configuration of the fly-line to leader connecting device of FIG. 13 after it has been cold drawn;

FIG. 16 depicts a front view of the alternate configuration of the fly-line to leader connecting device of FIG. 15 with the pulling loops clipped off and the device installed over the end of a fly-fishing line;

FIG. 17 depicts an enlarged isometric detail view of the cold drawn tubular lattice of the fly-line to leader connecting device of FIG. 16;

FIG. 18 depicts an isometric view of the fly-line to leader connecting device being installed over the fly-fishing line using a tubular assembly aid;

FIG. 19 depicts an enlarged isometric detail view of the fly-line to leader connecting device of FIG. 18 being installed using a tubular assembly aid;

DETAILED DESCRIPTION

Figure 1:
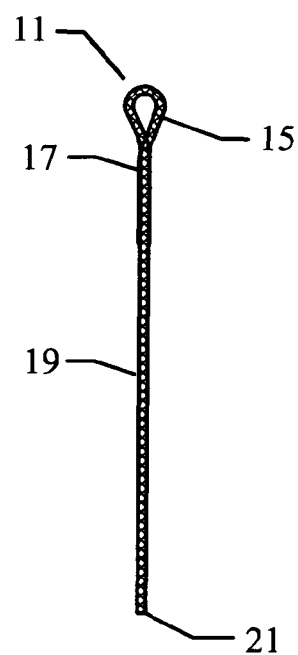
FIG. 1 depicts a front view of the "prior art" braided splice.
Figure 2:
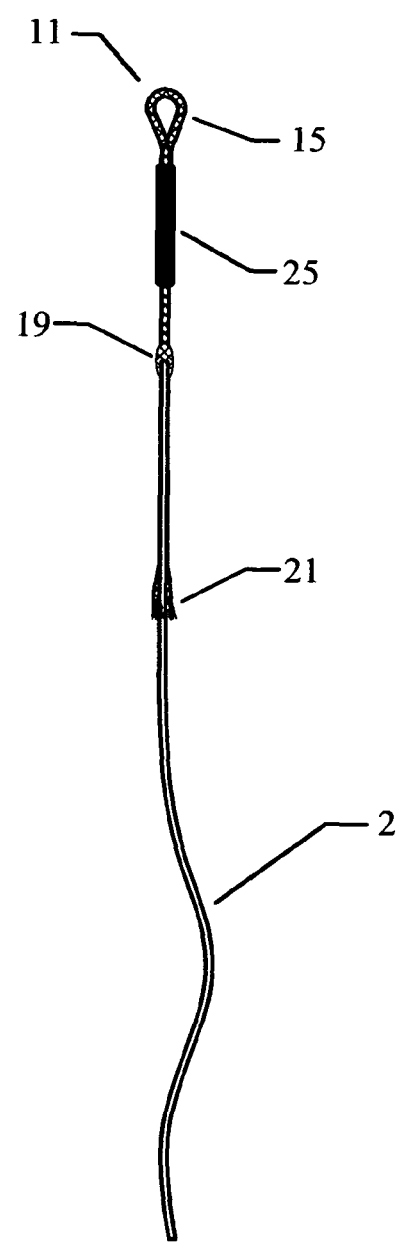
FIG. 2 depicts a front view of the "prior art" braided splice with the fly-line and heat shrink tubing partially installed.
Figure 3:
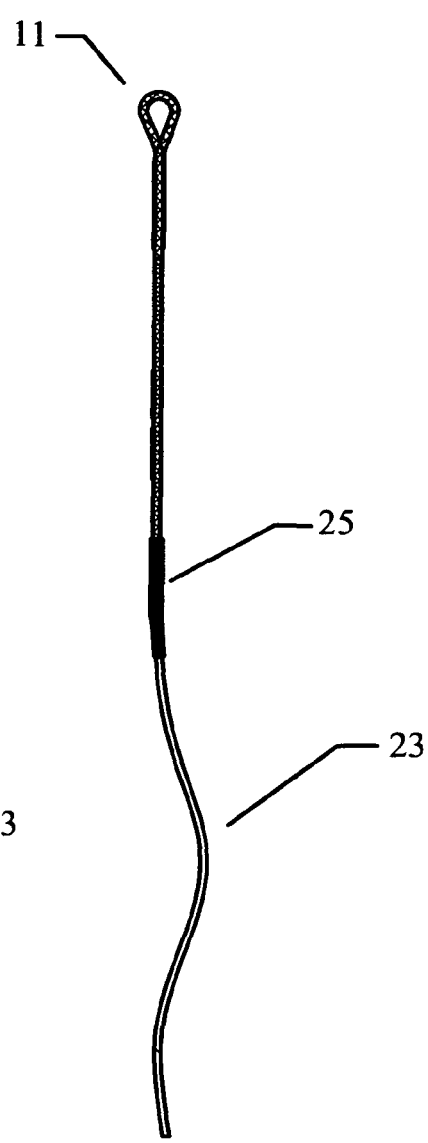
FIG. 3 depicts a front view of the "prior art" braided splice with the fly-line fully inserted and the heat shrink tubing shrunk down over the frayed end.

The prior art "braided loop" device 11 is shown in the FIGS. 1 through 3. The device 11 as shown in FIG. 1 is formed of a braided (nylon) tubular sleeve 19 with a hand formed loop at 15. The loop 15 is made by tucking the end of the braided sleeve back into a stretched region of the weave where it is secured by cementing approximately 1" of overlapping length of the braided nylon as seen at 17. The braided tubular sleeve 19 has an open tubular end to receive the fly line at 21. The FIG. 2 shows the fly line 23 being pushed into the expanded woven sleeve 19. The braided sleeve 19 opens up to receive the fly-line 21 as it is locally compressed. In order to get the fly line 23 fully inserted into the braided loop sleeve 19 it is necessary to tease the line further and further up the braided sleeve. This procedure is somewhat tedious as both the fly line and braided loop are prone to flexing. The braided loop device 11 stays in place on the fly-line 23 by a mechanism similar to how a Chinese finger trap (child's toy) stays affixed over a finger. The handling required to push the fly line 23 into the braided loop 11 always results in the fraying or unraveling of the woven fibers at the sleeve opening 21 as seen in FIG. 2. This unraveling of the braided loop opening during installation of the fly line is a significant problem with this braided loop design. In order to prevent snagging of the braided loop and the possibility of the device slipping off the fly line 23, it is necessary to cover this frayed area with a length of heat shrink tubing 25 as seen in FIG. 3. The necessity to cover this frayed area 21 with heat shrink tubing 25 or in some cases flexible tubing is a major drawback associated with using these braided loops. The heat shrink tube, requiring a heat source capable of reaching temperatures over 230°

F. is difficult to apply, adds significant weight and does not always remain securely in position. The braided loops can slip off the fly line if the heat shrink tubing does not stay in position or any of the many obstacles or snags as one typically encounters while fishing come into contact with this edge region during line retrieval. A further disadvantage of these braided loops is that the fly line engagement length is reduced and weight is increased by the approximate 1" length of overlap that is used to form the loop 15. Finally, the loop 15 to which the leader is attached is quite large as compared to the fly line and leader line diameter. The loop 15 tends to snag on rod guides and can contribute to excessive water and wind resistance during casting and/or retrieval of the fly line. Finally, the loop 15 is the only available leader line affixing option that is available with these braided loops 11.

Referring to the drawing FIGS. 4 and 5, there is shown the Fly Line Connecting Device or connector 31 consisting of an expandable tubular lattice 33 and a connecting loop 35, adapted to be inter-looped (connected) with the leader line. Alternatively, a cylindrical knot trap 43 is provided as a more streamlined alternative for attaching the leader line using a small knot. The fly line to leader connecting device 31 has stretching loops 37 and 39 located at the opposite distal ends. These loops 37 and 39 are used as an aid in cold drawing or stretching the device to the working dimensions as shown in FIG. 5. The cold drawing of the connecting device 31 is important for the following reasons:

The cold drawing process re-orients the polymer molecules linearly along the cold-drawing axis, adding substantially to the tensile strength and toughness of the stretched sections of the tubular lattice 34. The resultant decree in cross section that accompanies the cold-drawing operation makes it possible to have a thin, flexible, and somewhat "springy" fly line gripping tubular lattice 34.

Since the preferred manufacturing method is by injection molding, the cold drawing allows for molding the device in an intermediate condition where the length and wall section are sufficiently large to allow for an adequate flow of the plastic polymer to fill the mold.

The leader connecting device 31 feature cross sections can be manipulated to allow some areas of the device to be cold drawn while other thicker regions maintain their "as-molded" dimensions. This can be seen as one compares the characteristics of the leader connecting device features from the FIG. 4 to the FIG. 5. It can be seen that the cold drawn tubular lattice 34 has been stretched by approximately three times (3×) the original length and the diameter decreased by approximately two times (2×). The thicker cross section features such as the leader connecting loop 35 and knot trap 43 are not cold drawn. The distally located stretching loops 37 and 39 are also not cold-drawn. It may be found for some applications of the Fly Line Connecting Device 31 that any one of these "not" cold-drawn features may be configured with a smaller cross section to allow for cold drawing.

Figure 6:
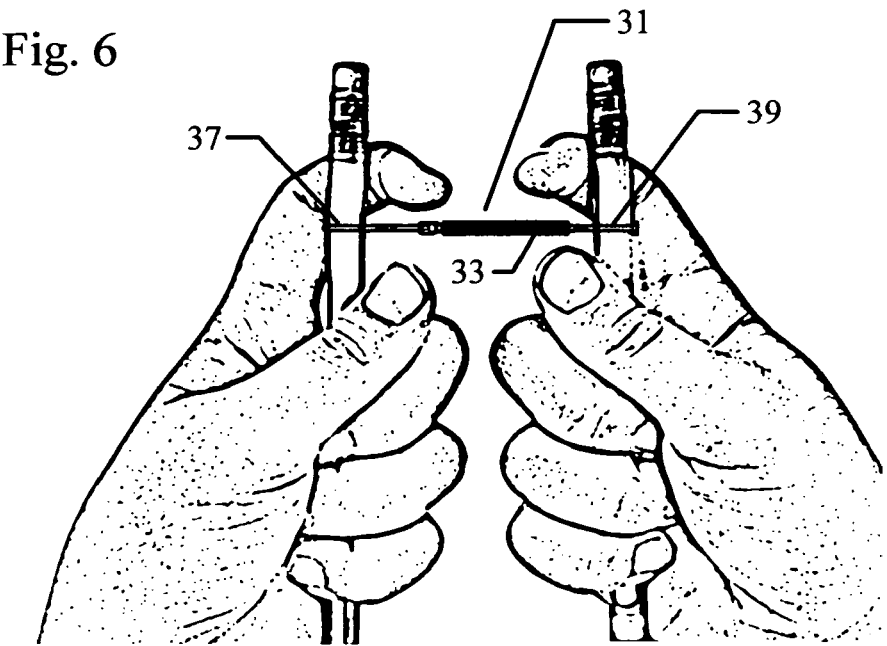
FIG. 6 depicts a side view of the fly-line to leader connecting device with the stretching loops being mounted over two pencils, just prior to being cold drawn.
Figure 7:
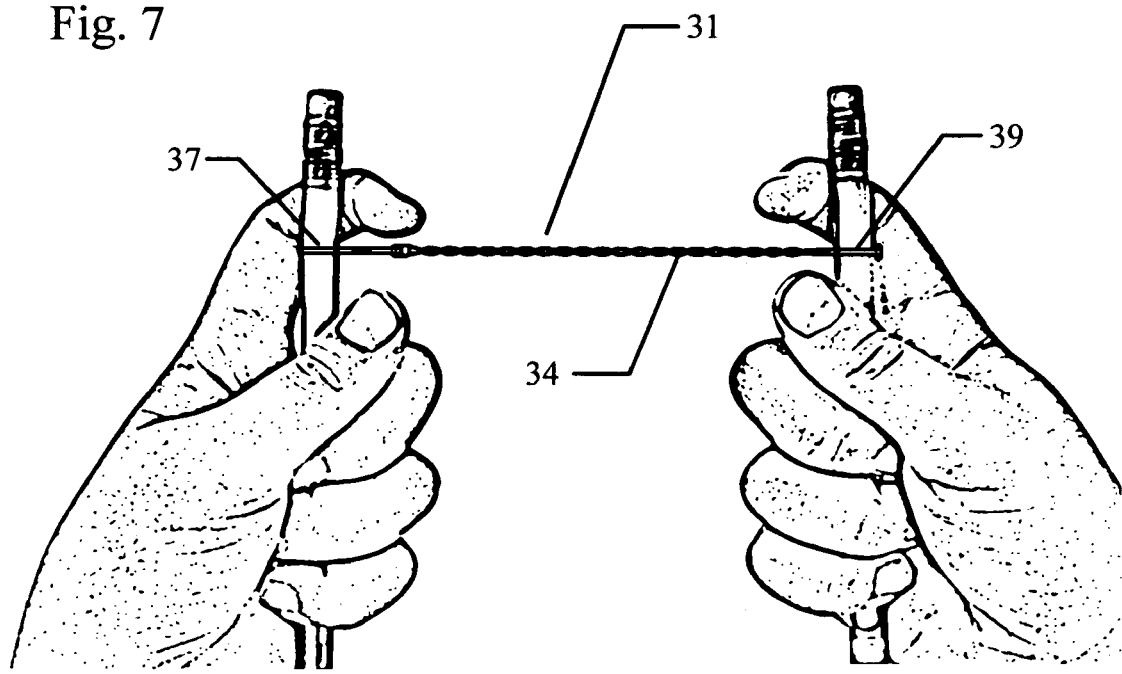
FIG. 7 depicts a side view of the fly-line to leader connecting device with the stretching loops being mounted over two pencils after cold drawing.

Referring to FIGS. 6 and 7, there is shown the Fly Line Connecting Device 31 having the stretching loops 37 and 39 secured over a pencil before (FIG. 6) and after the cold drawing or stretching operation (FIG. 7). These figures show an embodiment of the connecting device 31 that has a tubular lattice 33 cross sectional area that is small enough to allow the fisherman to manually cold-draw the device. Alternatively, the connecting device 31 may be cold drawn prior to sale using a specially designed injection mold or stretching fixture in a secondary manufacturing operation. Reference the U.S. Pat. No. 4,178,342 for disclosure of injection molding combined with cold drawing operation. This machine cold-drawing may be desirable, especially if it is found that a slightly larger cross sectional area for the tubular lattice is required for higher tensile strength or to make the manual insertion of the fly line easier.

Referring to the drawing FIGS. 8, 9 and 10, there is shown the Fly Line Connecting Device 31 having both a leader connection loop 35 and knot trap feature 43 for attaching the leader or tippet line. The drawing FIGS. 8, 9 and 10 show the sequence of operations to cold-draw, clip and install the fly line connecting device 31 over the fly line 23. The FIG. 8 shows the device 31 in the as molded or intermediate form. The circular feature 41 located on the back of the stretching loop 39 is an artifact from the injection mold core pin that forms the inside of the tubular lattice 33 and the inside features of the knot trap 43. This artifact feature 41 has no specific function other than allowing the stretching loop 39 to be located in-line with the center of the tubular lattice 33. It is desirable to keep the stretching loops 39 and 37 centered with the tubular lattice 33 to simplify the injection mold and to prevent any shear force distortion when the device 31 is cold drawn. The FIG. 9 shows the device 31 after it is stretched or cold-drawn. The only feature that is small enough in cross section to be cold drawn is the tubular lattice 34. The FIG. 10 shows the fly line 23 pushed up into the compressibly expanded tubular lattice 34 after the loops 37 and 39 have been clipped off. The connecting device 31 is now ready for the loop 35 or knot trap 43 connection of the leader line.

Figure 11:
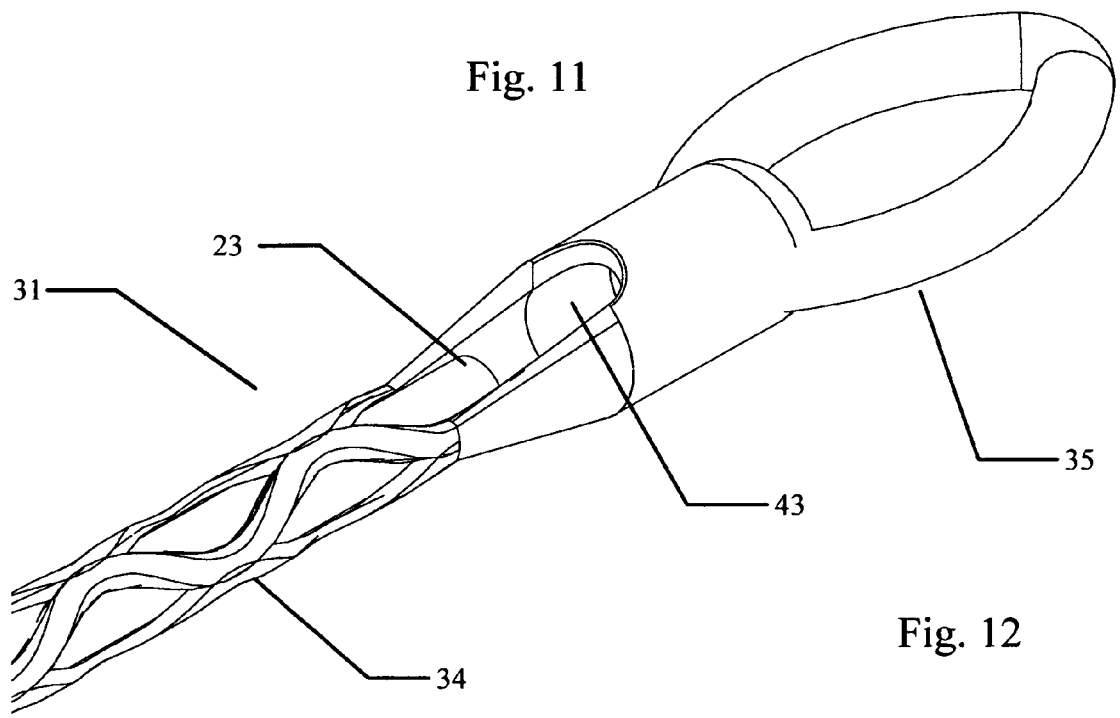
FIG. 11 depicts an enlarged isometric end view of the device of FIG. 10.
Figure 12:
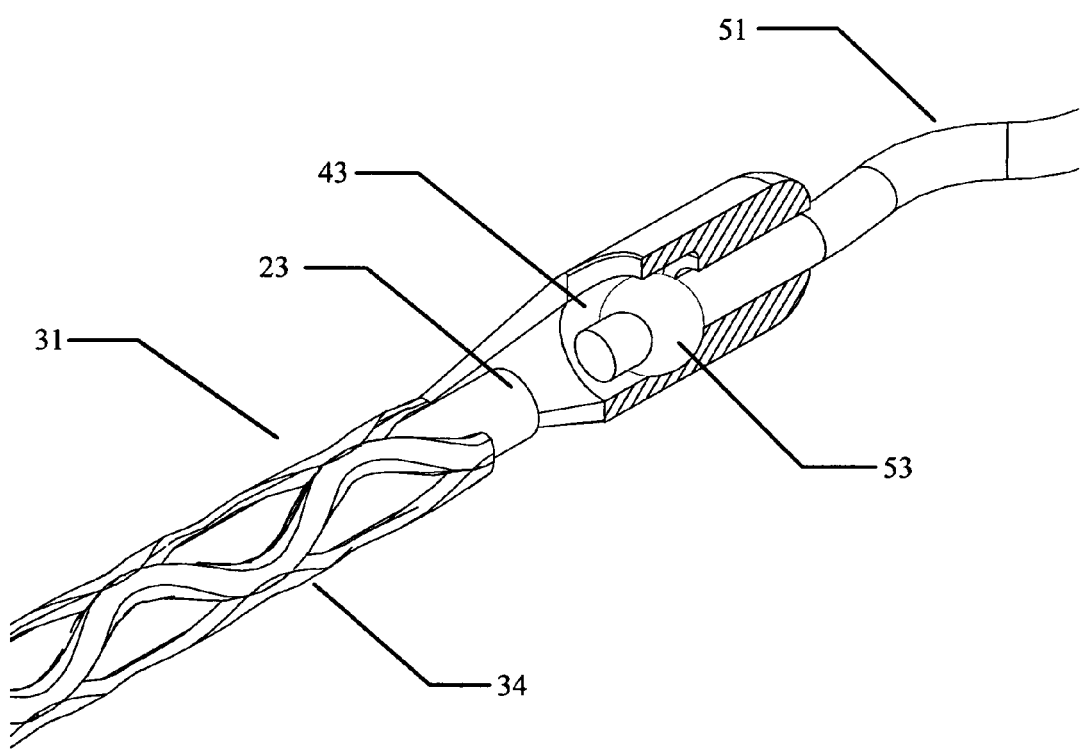
FIG. 12 depicts an enlarged partial section of the device of FIG. 10 showing the details of the knot trap and leader line attachment.

Referring to the drawing FIGS. 11 and 12, there is shown an enlarged view of the Fly-Line Connecting Device 31. The drawings show the cold drawn tubular lattice 34 as it elastically "grips" the semi-resilient surface of the fly line 23. The tubular lattice 34 has a "functional geometry" that acts to expand the inside diameter when it is axially compressed. It can be seen from the drawing FIGS. 11 and 12 that the expandable tubular lattice 34 is a unitary structure with no interweaving. The expanding and contracting action of the connection device tubular lattice 34 may look similar to that of the prior art braided loop, but it is based on an entirely different mechanism. The prior art (interwoven) braided loops expand and contract by the loosening and tightening action of the weave—just like a Chinese finger trap. The expanding and contracting action of the tubular lattice 34 is due to the opening (expansion) and closing (contraction) action of the openings in the lattice of the tubular web. It is important to note that the unitary structure of tubular lattice 34 is not subject to flaying at the opening. In order for the post drawn tubular lattice 34 to effectively clamp on the fly line 23 as seen in the FIGS. 11 and 12 it is necessary that the internal diameter of the tubular web (after cold drawing) be slightly smaller than the outside diameter of the fly line 23. This dimensional interference between the inside diameter of the tubular lattice 34 and the outside diameter of the fly line 23 does not need to be very large, (approximately 0.005" to 0.010") but it must be sufficient to prevent the connecting device 31 from slipping off the fly line 23 when there is low or no tension. It can be seen that the tubular lattice 34 portion of the fly-line connecting device will constrict onto the fly-line 23 even tighter (holding more securely) when they are placed in tension. This constricting action of the tubular lattice is critical if the connecting device of the instant invention is to hold the fly-line and leader lines together under the tensile forces that occur during fly-casting, line retrieval, and playing the fish.

The connection device 31 has both a leader connection loop 35 and a knot trap 43 for attaching the leader or tippet line. The patent FIG. 12 shows a partial cross-section of the knot trap 43 with the leader line or tippet 51 held in place by using a small overhand knot 53. The connection loop 35 can be clipped off if the knot trap 43 and leader knot 53 is used to attach the leader line 51. Although some fishermen prefer to make an inter-looped connection between the fly line and leader, they may come to appreciate that using the knot trap 43 allows for a very streamlined, axially supported connection between the fly line and the leader line.

Referring to the drawing FIGS. 13, 14 and 15, there is shown an alternate embodiment of the Fly Line Connection Device 55. This connection device 55 has stretching loops 57 and 59 and eyelets 61 and 65. This device employs a tubular lattice 63 as seen in detail in FIG. 14. This simplified geometry tubular lattice 63 was developed to allow for molding using a simple two-sided injection mold. The FIG. 15 shows the connection device 55 following the cold drawing operation. It can be seen in FIG. 15 that except for the stretching loops 57 and 59, the entire device 55, including the eyelets 62 and 66 are cold drawn.

The drawing FIG. 16 and detail FIG. 17 show that this alternative embodiment Fly Line Connection Device 55 is attached to the fly-fishing line 23 in an equivalent manner to the device shown in the previous FIGS. 10, 11 and 12. The FIG. 17 shows the cold drawn expandable tubular lattice 64 gripping the fly line 23. The connection device 55 has a tubular eyelet 62 for attaching the leader or tippet line. This tubular eyelet 62 may allow the leader line, once tied on there, to be threaded back up through the tube center to the tube end at 67 to make a streamlined connection. This alternative embodiment of the fly line connecting device 55 may be fabricated using a process of perforating or laser cutting a thin walled extruded tube, but this is probably not as economical as injection molding. If the device 55 were to be manufactured from perforated tubing, it would be necessary to include an extra length of tubing at both ends to assist the fisherman in holding the ends for cold drawing.

Looking at this alternative embodiment of the connection device 55 it should be apparent that there are other options for the expandable tubular lattice geometry, such as intersecting helical curves (clockwise and counter-clockwise) that would have an equivalent functional geometry or fly line gripping capability as those already detailed. It is also feasible to form an integral, and very thin walled tube on the inside of the tubular lattice by using a slightly undersized core pin in the injection-mold. In this example the lattice structure is not formed all the way through the tube and it is therefore necessary that the tube wall is thin enough to expand and contract with the lattice structure. A tubular lattice of this configuration will not grip the fly-line as securely as when the lattice openings go all the way through, but it may be helpful if there are problems with completely fining the injection mold.

Referring to the drawing FIGS. 18 and 19, there is shown the Fly Line Connection Device 31 being held constrained in a tubular channel 71. This tubular channel 71 has an internal diameter just slightly larger than the outside dimension of the cold drawn tubular lattice 34 after the fly line 23 has been installed. The tubular channel 71 is used as an assembly aid to assist the fisherman in threading the fly line 23 up into the tubular lattice 34. The tubular channel 71 assembly aid works by keeping the tubular lattice 34 from bending sideways while it is being axially compressed for insertion of the fly line 23. The tubular channel 71 may be a longitudinally cut or slit length of extruded tubing supplied with the Fly Line Connection Device(s). Alternatively a tubular channel assembly aid may be injection molded or designed as part of the connector device injection mold runner system.

Figure 20:
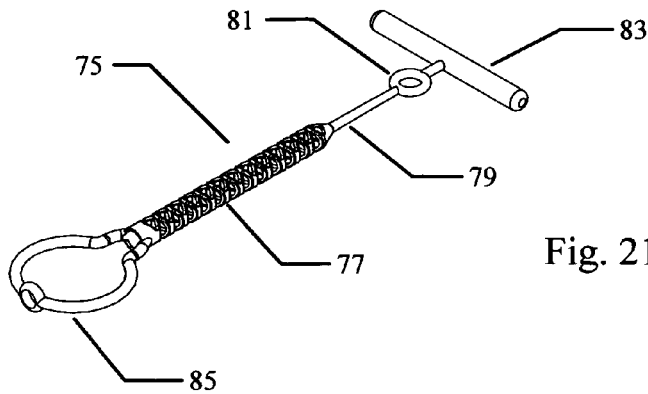
FIG. 20 depicts an isometric view of the fly-line to leader connecting device with an integral tippet with loop.
Figure 21:
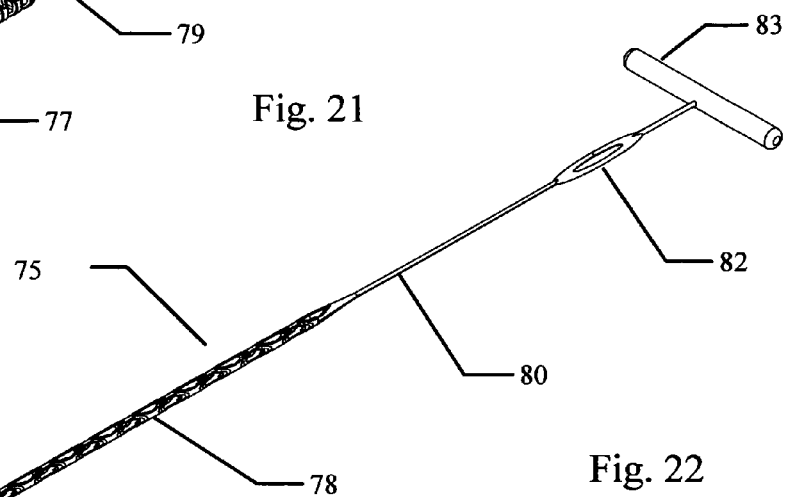
FIG. 21 depicts an isometric view of the device of FIG. 20 after it has been cold-drawn.
Figure 22:
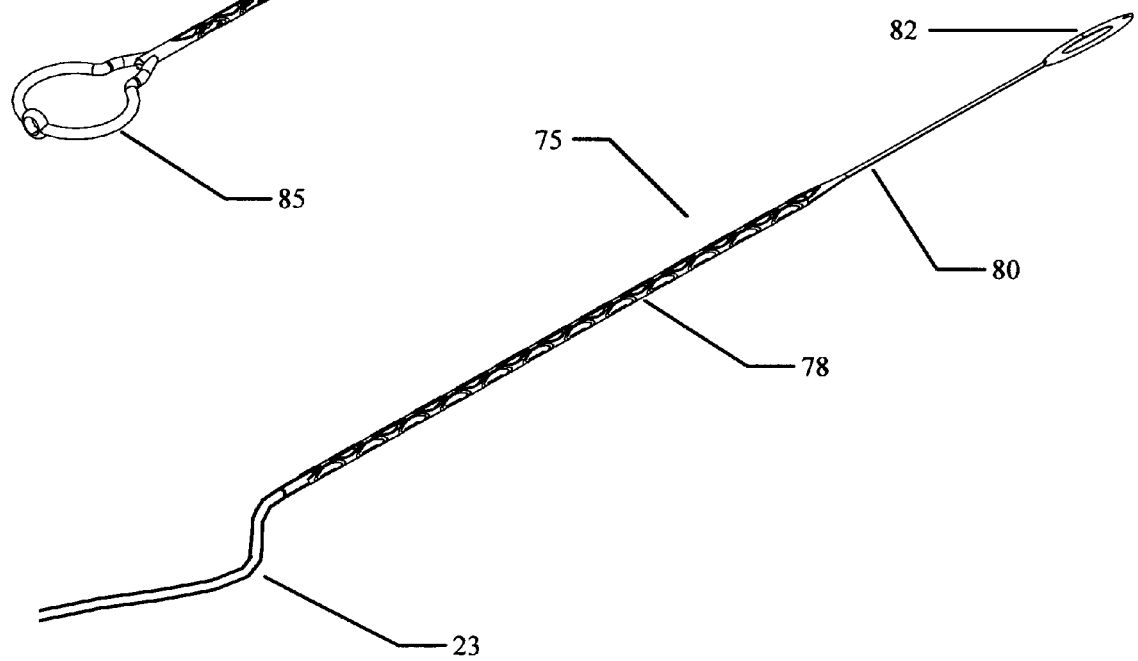
FIG. 22 depicts an isometric view of the device of FIG. 21 with the pulling bar clipped off and the device installed over the end of a fly-fishing line.

Referring to the drawing FIGS. 20, 21 and 22, there is shown a Fly-Line Connecting Device 75 with a short, integrally molded, leader line or tippet 79 and leader connection loop 81. This device 75 has an expandable tubular lattice 77 and stretching loop 85. The other end of the device 75 shows a stretching bar 83 that is functionally equivalent to the stretching loop 85. The stretching bar 83 or an equivalent grasping feature can be substituted for the stretching loops shown on any of the previously shown embodiments. The FIG. 21 shows the fly-line to leader connecting device 75 after it has been cold drawn. The tubular lattice 78, short tippet line 80, and leader connection loop 82 are noticeably longer and thinner due to the cold-drawing operation. The FIG. 22 shows the connecting device 75 installed over the fly fishing line 23 after the stretching loop 85 and stretching bar 83 has been clipped off. This "integral tippet" embodiment of the connecting device 75 shows that it is feasible to form a short length of cold drawn, tapered leader line at the end of the expandable tubular lattice. Since many fly fishermen use homemade tippet leaders tied from progressively lighter (lower tensile test) lengths of line, the connecting device 75 with a relatively short length of tapered leader and a small loop end may be very convenient for them.

Figure 23:
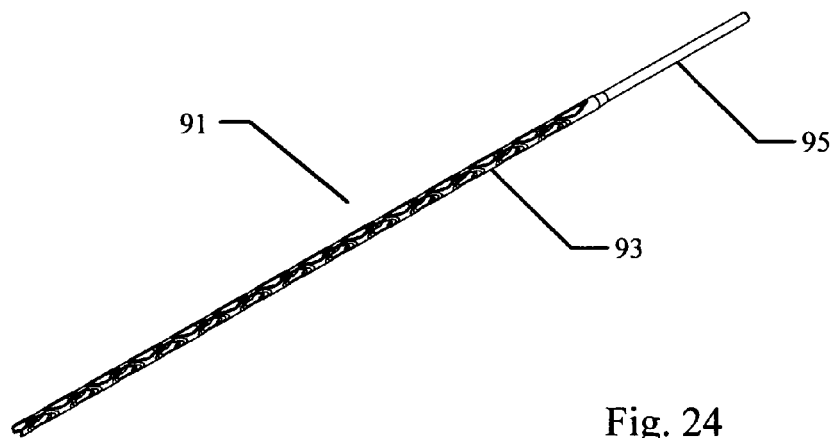
FIG. 23 depicts an isometric view of the fly-line to leader connecting device configured for permanent attachment to a full length leader line.
Figure 24:
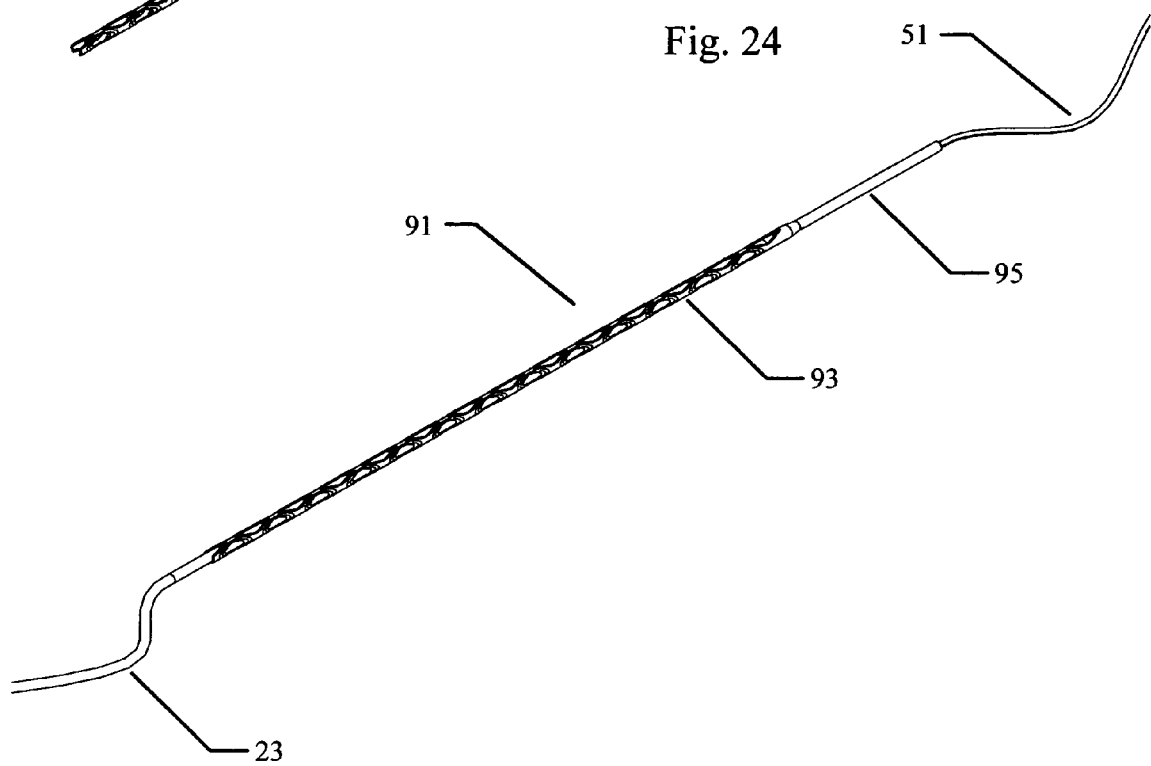
FIG. 24 depicts an isometric view of the fly-line to leader connecting device with a permanent attachment of a fill-length leader line.

The very flexible and elongated tubular form of the Fly Line Connecting Device lends itself to the option of being commercially supplied as pre-attached to a full length leader or tippet line as shown in the drawing FIGS. 23 and 24. The fly-line connecting device 91 is shown with a cold-drawn tubular lattice 93 and a thin-walled, cold drawn tubular extension 95. The FIG. 24 shows the connecting device 91 with a full-length leader line 51 having been inserted into the tubular extension 95 where it is secured by being cemented or welded. The tubular extension 95 may be made as an integral, but smaller diameter extension of the tubular lattice so that it can be cemented onto the leader line from the outside. As the material of the connecting device is typically the same or very similar to that used for nylon or fluorocarbon leaders, the connection between them can be very reliably made. This material equivalence also makes possible the manufacture of the fly-line connecting device integrally molded with a tapered leader. A process for making a tapered leader from a cold-drawn blank being disclosed in the U.S. Pat. No. 4,155, 973. The process of cold drawing the tapered leader is simply extended through the integrally formed intermediate form, of the connector tubular lattice.

The pre-attached connecting device 91 would then be very easily attached to the fly-line 23. This leader with a pre-attached or integrally molded connector may be quite convenient and popular with fly fisherman. This configuration of the connector 91 allows for an almost seamless dimensional and stiffness transition between the fly-line and leader line.

The expandable tubular lattice structure of the instant invention can hold or grip the fly-line securely without having to be as long as the prior art braided loop devices. This shorter length, and the development of some very high melt-flow-rate polymers, might allow for the fly-line to leader connecting device to be molded to the final dimensions without requiring stretching or cold drawing. It should be clear from this disclosure that the compressively expandable tubular lattice is the defining feature of the fly-line to leader connection device of the instant invention, whether or not it is produced using a cold drawing process. The expandable tubular lattice of the fly-line to leader connection device is not necessarily limited to being made round, but a round configuration is probably preferred as it allows a fill perimeter contact with the typically round cross-section fly-line. Since the fly-line to leader connector device is typically injection molded there are numerous options, including a loop, eyelet, knot trap, or short tippet that can be formed integrally into the connection device for attaching the leader or tippet line.

Finally, the connection point between the fly-fishing line and the leader line is a reference point that many fly fisherman desire to be clearly visible when they are fishing. When this junction is clearly marked, it is typically referred to as a "strike indicator". Many fly-fisherman go to some trouble to add a brightly colored marking device to this fly-line to leader junction. It is for this reason that the prior art braided loops are typically made in some very high visibility colors. The fly-line to leader connecting device of the instant invention will perform as a strike indicator when it is made from a plastic resin that is highly visible and/or fluorescent colored.

I have now described my invention in considerable detail. However, it is obvious that others skilled in the art can build and devise alternate and equivalent constructions that are nevertheless within the spirit and scope of my invention. Hence, I desire that my protection be limited not by the constructions illustrated and described, but only by the proper scope of the appended claims.

What is claimed is:

1. A connector in combination with a fly line, the connector including at one end thereof a welded, cemented, or integrally molded leader line, and an opposite end of the connector having an elongate, flexible, unitary structured, non-woven tubular lattice, said tubular lattice having a functional geometry that when subjected to axial compression operates to expand an internal dimension of the tubular lattice to allow insertion of the fly line, and when released from axial compression, contracts down to make elastic contact with, and thereby to grip the fly line, and wherein said connector tubular lattice acts to further constrict and hold secure the fly line when said leader line and fly line are subjected to tensile forces passing through the connector as may be encountered when fly fishing.

2. The connector in combination with a fly line of claim 1, in which the connector is made of a synthetic plastic resin.

3. The connector in combination with a fly line of claim 1, in which the connector is made of a fluorescent colored resin in order for said connector to function secondarily as a strike indicator.

4. The connector in combination with a fly line of claim 1, in which the connector is made of a synthetic plastic resin that allows the tubular lattice to be cold drawn, the cold drawing acting both to lengthen the tubular lattice and to reduce an inside diameter of the tubular lattice to less than an outside diameter of the fly line.

5. The connector in combination with a fly line of claim 4, in which the connector has integral stretching loops or stretching bars to facilitate a manual or automated cold-drawing operation.

6. The connector in combination with a fly line of claim 1, for which a tubular channel assembly aid is provided for installing the connector over the fly line.

7. A connector in combination with a fly line and a leader line, the connector including at one end thereof a knot trap, loop, eyelet, or a short integrally formed tippet line for connection to the leader line, and an opposite end of the connector having an elongate, flexible, unitary structured, non-woven tubular lattice, said tubular lattice having a functional geometry that when subjected to axial compression operates to expand an internal dimension of the tubular lattice to allow insertion of the fly line, and when released from axial compression, contracts down to make elastic contact with, and thereby to grip the fly line, and wherein said connector tubular lattice acts to further constrict and hold secure the fly line when the leader line and fly line are subjected to tensile forces passing through the connector as may be encountered when fly fishing.

8. The connector in combination with a fly line and a leader line of claim 7, in which the connector is made of a synthetic plastic resin.

9. The connector in combination with a fly line and a leader line of claim 7, in which the connector is made of a fluorescent colored resin in order for said connector to function secondarily as a strike indicator.

10. The connector in combination with a fly line and a leader line of claim 7, in which the connector is made of a synthetic plastic resin that allows the tubular lattice to be cold drawn, the cold drawing acting both to lengthen the tubular lattice and to reduce an inside diameter of the tubular lattice to less than an outside diameter of the fly line.

11. The connector in combination with a fly line and a leader line of claim 10, in which the connector has integral stretching loops or stretching bars to facilitate a manual or automated cold-drawing operation.

12. The connector in combination with a fly line and a leader line of claim 7, for which a tubular channel assembly aid is provided for installing the connector over the fly line.

* * * * *